United States Patent
Waddington et al.

(10) Patent No.: US 6,762,274 B2
(45) Date of Patent: Jul. 13, 2004

(54) LOW EMISSION POLYURETHANE POLYMERS MADE WITH AUTOCATALYTIC POLYOLS

(75) Inventors: Simon Waddington, Luins (CH); Jean-Marie L. Sonney, Gingins (CH); Richard J. Elwell, Terneuzen (NL); Francois M. Casati, Prevessin—Moens (FR); Antoine Storione, Geneva (CH)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 10/203,496

(22) PCT Filed: Feb. 2, 2001

(86) PCT No.: PCT/US01/03484
§ 371 (c)(1),
(2), (4) Date: Aug. 10, 2002

(87) PCT Pub. No.: WO01/58976
PCT Pub. Date: Aug. 16, 2001

(65) Prior Publication Data
US 2003/0100699 A1 May 29, 2003

Related U.S. Application Data
(60) Provisional application No. 60/181,617, filed on Feb. 10, 2000.

(51) Int. Cl.$^7$ .............................................. C08G 18/50
(52) U.S. Cl. ....................... 528/78; 521/164; 521/167; 252/182.26; 564/505
(58) Field of Search ................................. 521/164, 167; 528/78; 252/182.26; 564/505

(56) References Cited

U.S. PATENT DOCUMENTS

| | | | |
|---|---|---|---|
| 3,094,434 A | | 6/1963 | Chapman et al. |
| 3,838,076 A | | 9/1974 | Moss et al. |
| 4,040,992 A | | 8/1977 | Bechara et al. |
| 4,296,230 A | | 10/1981 | Pedain et al. |
| 4,377,674 A | * | 3/1983 | Blount |
| 4,517,313 A | | 5/1985 | Nakatani |
| 4,644,017 A | | 2/1987 | Haas et al. |
| 5,308,882 A | | 5/1994 | Washington |
| 5,476,969 A | | 12/1995 | Hinz et al. |
| 5,512,602 A | | 4/1996 | Horn et al. |
| 5,525,641 A | | 6/1996 | White, III et al. |
| 5,527,602 A | | 6/1996 | Eisen et al. |
| 5,605,605 A | | 2/1997 | Coleman et al. |
| 5,672,636 A | | 9/1997 | Horn et al. |
| 5,705,672 A | | 1/1998 | Konig et al. |
| 5,709,776 A | | 1/1998 | Coleman et al. |

FOREIGN PATENT DOCUMENTS

| | | |
|---|---|---|
| EP | 0 047 371 | 3/1982 |
| EP | 0 488 219 B1 | 3/1997 |
| EP | 0 747 407 B1 | 1/1999 |
| JP | 08169931 * | 7/1996 |
| WO | 94/02525 | 2/1994 |

OTHER PUBLICATIONS

Patent Abstract of Japan, *Mitsui Toatsu Chemical Inc.*, appl.# 06206969, Jul. 26, 1994, vol. 018, No. 568.

* cited by examiner

Primary Examiner—Rachel Gorr

(57) ABSTRACT

The present invention discloses a process for producing a polyurethane product with autocatalytic polyols. These auto-catalytic polyols are based on an initiator of the formula (I): $H_mA-(CH_2)_n—N(R)-(CH_2)_p-AH_m$ where n and p are independently integers from 2 to 6, A at each occurrence is independently oxygen, nitrogen or hydrogen, with the proviso that only one of A can be hydrogen at one time, R is a $C_1$ to $C_3$ alkyl group, m is equal to 0 when A is hydrogen, is 1 when A B is oxygen and is 2 when A is nitrogen; or are polyols which contain an alkyl amine of within the polyol chain or a dialkylylamino group pendant to the polyol chain wherein the polyol chain is obtained by copolymerization of at least one monomer containing an alkyl aziridine or N,N-dialkyl glycidylamine with at least one alkylene oxide. These auto-catalytic polyols are reacted with a polyisocyanate in the presence of other additives and/or auxiliary agents known per se to produce polyurethane products.

31 Claims, No Drawings

LOW EMISSION POLYURETHANE POLYMERS MADE WITH AUTOCATALYTIC POLYOLS

This application claims priority from provisional application No. 60/181,617, filed Feb. 10, 2000.

The present invention pertains to low emission polyurethane polymer products based on autocatalytic polyols and to the process for their manufacture.

BACKGROUND OF THE INVENTION

Polyether polyols based on the polymerization of alkylene oxides, and/or polyester polyols, are the major components of a polyurethane system together with isocyanates. These systems generally contain additional components such as cross-linkers, chain extenders, surfactants, cell regulators, stabilizers, antioxidants, flame retardant additives, eventually fillers, and typically catalysts such as tertiary amines and/or organometallic salts.

Organometallic catalysts, such as lead or mercury salts, can raise environmental issues due to leaching upon aging of the polyurethane products. Others, such as tin salts, are often detrimental to polyurethane aging.

The commonly used tertiary amine catalysts give rise to several problems, particularly in flexible, semi-rigid and rigid foam applications. Freshly prepared foams using these catalysts often exhibit the typical odor of the amines and give rise to increased fogging (emission of volatile products).

The presence, or formation, of even traces of tertiary amine catalyst vapors in polyurethane products having vinyl films or polycarbonate sheets exposed thereto can be disadvantageous. Such products commonly appear in automotive interiors as seats, armrests, dashboards or instrument panels, sun visors, door linings, noise insulation parts either under the carpet or in other parts of the car interior or in the engine compartment, as well as in many domestic applications such as shoe soles, cloth interliners, appliance, furniture and bedding. While these materials perform excellently in these applications, they possess a deficiency that has been widely recognized. Specifically, the tertiary amine catalysts present in polyurethane foams have been linked to the staining of the vinyl film and degradation of polycarbonate sheets. This PVC staining and polycarbonate decomposition problems are especially prevalent in environments wherein elevated temperatures exist for long periods of time, such as in automobile interiors, which favor emission of amine vapors.

Various solutions to this problem have been proposed. For instance, U.S. Pat. No. 4,517,313 discloses the use of the reaction product of dimethylaminopropylamine and carbonic acid as a catalyst for use in the manufacture of polyurethane. The use of this catalyst is stated to reduce odor and vinyl staining relative to the use of standard triethylenediamine catalysts. However this amine catalyst cannot match the performance of a standard catalyst such as triethylenediamine in polyurethane curing since it is a much weaker catalyst. EP 176,013 discloses the use of specific aminoalkylurea catalysts in the manufacture of polyurethanes. Use of these catalysts is also said to reduce odor and vinyl staining through the use of relatively high molecular weight amine catalysts. Due to their high molecular weight, these amine catalysts are unable to readily migrate through a polyurethane foam and thus their propensity to produce odors and stain vinyl films is reduced. However, when subjected to elevated temperatures as are commonly encountered in automobile interiors parked outside during summertime, these compounds migrate within a foam to some degree.

Use of amine catalysts which contain a hydrogen isocyanate reactive group such as a hydroxyl or a primary and/or a secondary amine are proposed by catalyst suppliers. One such compound is disclosed in EP 747,407. A reported advantage of the catalyst composition is that they are incorporated into the polyurethane product. However those catalysts usually have to be used at high levels in the polyurethane formulation to compensate for their lack of mobility during the reactions to get normal processing conditions. As a result generally not all of these molecules have time to react with isocyanates and some traces of free amine are typically present in the final product, especially in the case of fast gelling and fast curing systems.

Pre-polymerization of reactive amine catalysts with a polyisocyanate and a polyol is reported in PCT WO 94/02525. These isocyanate-modified amines show comparable or enhanced catalytic activity compared with the corresponding non-modified amine catalysts. However, this process gives handling difficulties such as gel formation and poor storage stability.

Specific crosslinkers are proposed in U.S. Pat. No. 4,963,399 to produce polyurethane foams that exhibit a reduced tendency to stain vinyl films. These crosslinkers cannot be used at levels sufficient to get the desired catalytic activity, since they negatively affect foam processing, due to too fast gelling, and foam properties such as tear strength and elongation at break are detrimentally affected due to a level of crosslinking density which is too high. Such disadvantages would also be present for long chain tertiary aminoalcohol crosslinkers as disclosed in EP 488,219.

Modification of polyols by partial amination has been disclosed in U.S. Pat. No. 3,838,076. While this gives additional reactivity to the polyol, this does not allow adjustment of processing conditions since these aminated functions are rapidly tied in the polymer by reacting with the isocyanate. Hence they give fast initiation of the reactions but subsequently loose most of their catalytic activity and do not provide proper final curing.

Use of specific amine-initiated polyols is proposed in EP 539,819 and in U.S. Pat. No. 5,672,636 as applied in semi-rigid and rigid polyurethane foam applications.

Acid modified polyoxypropyleneamine are used as catalysts in U.S. Pat. No. 5,308,882 but still require the use of an organometallic co-catalyst.

Therefore, there continues to be a need for alternative means to control vinyl staining and polycarbonate decomposition by polyurethane compositions.

There also remains a need to eliminate or reduce the amount of amine catalysts and/or organometallic salts in producing polyurethane products.

It is an object of the present invention to produce polyurethane products containing a reduced level of conventional tertiary amine catalysts, a reduced level of reactive amine catalysts or polyurethane products produced in the absence of such amine catalyst. It an another objective of the present invention to produce polyurethane products containing a reduced level of organometallic catalyst or to produce such products in the absence of organometallic catalysts. With the reduction of the amount of amine and/or organometallic catalysts needed or elimination of such catalysts, the disadvantages associated with such catalysts as given above can be minimized or avoided.

It is a further object of the present invention to provide polyols containing autocatalytic activity so that the industrial manufacturing process of the polyurethane product is not adversely affected and may even be improved by the reduction in the amount of conventional or reactive amine catalysts or in elimination of the amine catalyst, and/or by reduction or elimination of organometallic catalysts.

In another aspect, the use of the autocatalytic polyols of the present invention could reduce the level of amine catalysts to which workers would be exposed in the atmosphere in a manufacturing plant.

SUMMARY OF THE INVENTION

The present invention is a process for the production of a polyurethane product by reaction of a mixture of
(a) at least one organic polyisocyanate with
(b) a polyol composition comprising
  (b1) from 0 to 95 percent by weight of a polyol compound having a functionality of 2 to 8 and a hydroxyl number of from 20 to 800 and
  (b2) from 5 to 100 percent by weight of at least one polyol compound having a functionality of 1 to 8 and a hydroxyl number of from 20 to 800
  wherein the weight percent is based on the total amount of polyol component (b), and (b2) is
  (b2a) obtained by alkoxylation of at least one initiator molecule of the formula

$$H_mA\text{-}(CH_2)_n\text{---}(R)\text{-}(CH_2)_p\text{-}AH_m \qquad \text{Formula (I)}$$

where n and p are independently integers from 2 to 6,
A at each occurrence is independently oxygen, nitrogen or hydrogen, with the proviso that only one of A can be hydrogen at one time,
R is a $C_1$ to $C_3$ alkyl group,
m is equal to 0 when A is hydrogen, is 1 when A is oxygen and is 2 when A is nitrogen;
or (b2b) a compound which contains an alkyl amine within the polyol chain or a di-alkyl amino group pendant to the polyol chain wherein the polyol chain is obtained by copolymerization of at least one monomer containing an alkylaziridine or N,N-dialkyl glycidylamine with at least one alkylene oxide, wherein the alkyl or di-alkyl moiety of the amine is a $C_1$ to $C_3$ alkyl;
or (b2c) a hydroxyl-tipped prepolymer obtained from the reaction of an excess of (b2a) or (b2b) with a polyisocyanate;
or (b2d) is a blend selected from (b2a), (b2b) or (b2c);
(c) optionally in the presence of a blowing agent; and
(d) optionally additives or auxiliary agents known per se for the production of polyurethane foams, elastomers and/or coatings.

In another embodiment, the present invention is a process as disclosed above wherein the polyisocyanate (a) contains at least one polyisocyanate that is a reaction product of a excess of polyisocyanate with a polyol as defined by (b2a) or (b2b) above, or a mixture thereof.

In a further embodiment, the present invention is a process as disclosed above where the polyisocyanate contains a polyol-terminated prepolymer obtained by the reaction of an excess of polyol with a polyisocyanate wherein the polyol is a polyol as defined by (b2a) or (b2b) above, or a mixture thereof.

The invention further provides for polyurethane products produced by any of the above processes.

In still another embodiment, the present invention is an isocyanate-terminated prepolymer based on the reaction of a polyol as defined by (b2a), (b2b) or a mixture thereof with an excess of a polyisocyanate.

In yet another embodiment, the present invention is a polyol-terminated prepolymer based on the reaction of a polyisocyanate with an excess of polyol as defined by (b2a), (b2b) or a mixture thereof.

The polyols containing bonded alkyl amine groups as disclosed in the present invention are catalytically active and accelerate the addition reaction of organic polyisocyanates with polyhydroxyl or polyamino compounds and the reaction between the isocyanate and the blowing agent such as water or a carboxylic acid or its salts. The addition of these polyols to a polyurethane reaction mixture reduces or eliminates the need to include a conventional tertiary amine catalyst within the mixture or an organometallic catalyst. Their addition to polyurethane reaction mixtures can also reduce the mold dwell time in the production of molded foams or improve some polyurethane product properties.

As the disclosed polyols have an autocatalytic activity, these polyols require less capping with primary hydroxyls, that is, less ethylene oxide capping to obtain the same performance in flexible molded foam (curing time) than conventional polyols when used under the same conditions.

DETAILED DESCRIPTION

In accordance with the present invention, a process for the production of polyurethane products is provided, whereby polyurethane products of relatively low odor and emission are produced. Furthermore, the polyurethane products produced in accordance with the invention exhibit a reduced tendency to stain vinyl films or to degrade polycarbonate sheets with which they are exposed, display excellent adhesion properties (in appropriate formulations), have a reduced tendency to produce 'blue haze' which is associated with the use of certain tertiary amine catalysts, are more environmental friendly through the reduction/elimination of organometallic catalysts and these new polyurethane products should be easier to recycle by chemolysis since they possess an inherent basicity. These advantages are achieved by including in the reaction mixture either a polyol containing a tertiary alkyl amine of Formula I as an initiator or a polyol containing an alkyl amine as part of the polyol chain, or a di-alkylamino group pendant to the polyol chain or by including such polyols as feedstock in the preparation of a SAN, PIPA or PHD copolymer polyol and adding them to the reaction mixture or by using such polyols in a prepolymer with a polyisocyanate alone or with an isocyanate and a second polyol.

The combination of polyols used in the present invention will be a combination of (b1) and (b2) as described above. As used herein the term polyols are those materials having at least one group containing an active hydrogen atom capable of undergoing reaction with an isocyanate. Preferred among such compounds are materials having at least two hydroxyls, primary or secondary, or at least two amines, primary or secondary, carboxylic acid, or thiol groups per molecule. Compounds having at least two hydroxyl groups per molecule are especially preferred due to their desirable reactivity with polyisocyanates.

Suitable polyols (b1) that can be used to produce polyurethane materials with the autocatalytic polyols (b2) of the present invention are well known in the art and include those described herein and any other commercially available polyol and/or SAN, PIPA or PHD copolymer polyols. Such polyols are described in Polyurethane handbook, by G. Oertel, Hanser publishers. Mixtures of one or more polyols and/or one or more copolymer polyols may also be used to produce polyurethane foams according to the present invention.

Representative polyols include polyether polyols, polyester polyols, polyhydroxy-terminated acetal resins, hydroxyl-terminated amines and polyamines. Examples of these and other suitable isocyanate-reactive materials are described more fully in U.S. Pat. No. 4,394,491, the disclosure of which is incorporated herein by reference. Alternative polyols that may be used include polyalkylene carbonate-based polyols and polyphosphate-based polyols. Preferred are polyols prepared by adding an alkylene oxide, such as ethylene oxide, propylene oxide, butylene oxide, or a combination thereof, to an initiator having from 2 to 8, preferably 2 to 6 active hydrogen atoms. Catalysis for this polymerization can be either anionic or cationic, with catalysts such as KOH, CsOH, boron trifluoride, or a double cyanide complex (DMC) catalyst such as zinc hexacyanocobaltate.

The polyol or blends thereof employed depends upon the end use of the polyurethane product to be produced. The molecular weight or hydroxyl number of the base polyol may thus be selected so as to result in flexible, semi-flexible, integral-skin or rigid foams, RIM, elastomers or coatings, or adhesives when the polymer/polyol produced from the base polyol is converted to a polyurethane product by reaction with an isocyanate, and depending on the end product in the presence or not of a blowing agent. The hydroxyl number and molecular weight of the polyol or polyols employed can vary accordingly over a wide range. In general, the hydroxyl number of the polyols employed may range from about 20 to about 800.

In the production of a flexible polyurethane foam, the polyol is preferably a polyether polyol and/or a polyester polyol. The polyol generally has an average functionality ranging from 2 to 5, preferably 2 to 4, and an average hydroxyl number ranging from 20 to 100 mg KOH/g, preferably from 20 to 70 mgKOH/g. As a further refinement, the specific foam application will likewise influence the choice of base polyol. As an example, for molded foam, the hydroxyl number of the base polyol may be on the order of about 20 to about 60 with ethylene oxide (EO) capping, and for slabstock foams the hydroxyl number may be on the order of about 25 to about 75 and is either mixed feed EO/PO (propylene oxide) or is only slightly capped with EO. For elastomer applications, it will generally be desirable to utilize relatively high molecular weight base polyols, from about 2,000 to 8,000, having relatively low hydroxyl numbers, that is, about 20 to about 50.

Typically polyols suitable for preparing rigid polyurethanes include those having an average molecular weight of 100 to 10,000 and preferably 200 to 7,000. Such polyols also advantageously have a functionality of at least 2, preferably 3, and up to 8, preferably up to 6, active hydrogen atoms per molecule. The polyols used for rigid foams generally have a hydroxyl number of about 200 to about 1,200 and more preferably from about 300 to about 800.

For the production of semi-rigid foams, it is preferred to use a trifunctional polyol with a hydroxyl number of 30 to 80.

The initiators for the production of polyols (b1) generally have 2 to 8 functional groups, that will react with alkylene oxides. Examples of suitable initiator molecules are water, organic dicarboxylic acids, such as succinic acid, adipic acid, phthalic acid and terephthalic acid and polyhydric, in particular dihydric to octahydric alcohols or dialkylene glycols, for example, ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose or blends thereof. Other initiators include compounds linear and cyclic compounds containing a tertiary amine such as ethanoldiamine, triethanoldiamine, and various isomers of toluene diamine.

The autocatalytic polyols (b2) are those initiated with an alkyl amine as given by Formula I or containing an alkyl amine as part of the polyol chain. As part of the polyol chain means that this alkyl amine group can be introduced in the chain by using N-alkylaziridine or N,N-dialkyl glycidylamine as a co-monomer with ethylene oxide and/or propylene oxide in the production of an autocatalytic polyether polyol. The term alkyl as used herein with the alkylaziridine or N,N-dialkyl glycidylamine means a $C_1$ to $C_3$ alkyl. In a preferred embodiment the alkyl group is methyl. Processes for making such compounds are known in the art.

The properties of the autocatalytic polyols can vary widely as described above for polyol b(1) and such parameters as average molecular weight, hydroxyl number, functionality, etc. will generally be selected based on the end use application of the formulation, that is, what type of polyurethane product. Selection of a polyol with the appropriate hydroxyl number, level of ethylene oxide, propylene oxide and butylene oxide, functionality and equivalent weight are standard procedures known to those skilled in the art. For example, polyols with a high level of ethylene oxide will be hydrophilic and may be more prone to catalyze the water-isocyanate or urea reaction, while polyols with a high amount of propylene oxide or butylene oxide will be more hydrophobic and will favor the urethane reaction. It is also clear that the type of molecule based on Formula I will also influence the type of catalytic activity. For instance, when A is oxygen the hydrophilicity of (b2) will be higher than when A is nitrogen and/or hydrogen.

The production of polyols containing the compounds of Formula I as an initiator can be done by procedures well known in the art as disclosed for b(1). In general, a polyol (b2a) is made by the addition of an alkylene oxide (EO, PO, BO or glycidol), or a combination of alkylene oxides to the initiator by anionic or cationic reaction, use of KOH, CsOH, DMC catalyst, or tertiary oxonium salts as described in FR 2,053,045. The addition of the first alkylene oxide moles onto the product of formula I can be done auto-catalytically, that is, without addition of catalyst. Processing conditions such a reactor temperature and pressure, feeding rates are adjusted to optimize production yield. Of particular importance is the polyol unsaturation which is below 0.1 meq/g.

For some applications only one alkylene oxide monomer is used, for other applications a blend of monomers is used and in some cases a sequential addition of monomers is preferred, such as PO followed by an EO feed, EO followed by PO, etc. Use of glycidol gives polyols with increased functionalities. Other possibilities to get polyols with functionalities higher than the starter molecules is coupling of these starters with a diisocyanate or use of a diepoxide compound such as ERL 4221 made by Union Carbide.

The polyols of (b2a) and (b2b) include conditions where the polyol is reacted with a polyisocyanate to form a prepolymer and subsequently polyol is added to such a prepolymer.

Monols based on the definition of Formula I can also be used in polyurethane systems, either as softening additives or as viscosity reducers.

Polyester polyols can be prepared by the reaction of (b2a) or (b2b) with a diacid. These can be used in combination with conventional polyester polyols as used today in slabstock or in elastomers, such as shoe soles.

The limitations described with respect to the characteristics of the polyols b(1) and b(2) above are not intended to be restrictive but are merely illustrative of the large number of possible combinations for the polyol or polyols used.

In a preferred embodiment of Formula I, R is methyl. In another preferred embodiment R is methyl and n and p are integers of the same value. In a more preferred embodiment n and p are an integer of 2 to 4. Preferably when A is not hydrogen, A at each occurrence will be either oxygen or nitrogen. In a more preferred embodiment one A will be oxygen and the other A will be oxygen, and the final polyol (b2a) will be a triol.

The alkyl amines of Formula I are commercially available or can be made by techniques known in the art, such as U.S. Pat. No. 4,605,772, the disclosure of which is incorporated herein by reference. For example, methylamine is reacted with the appropriate alkylene oxide for producing compounds where A is oxygen. Preferably the alkylene oxide is ethylene oxide, propylene oxide, or butylene oxides, which gives a preferred range of 2 to 4 for n when each A is oxygen. Preferred compounds are N-methyldiethanolamine, N-methyldipropanolamine, N-methyldibutanol-amine, N-methylethanol-propananol-amine For producing compounds where each A is nitrogen, methyl amine can be reacted with any known reactive group that reacts with an amine and contains an additional nitrogen. For example, 2 moles of $X(CH_2)_n NR'R''$ can be reacted with one mole of methylamine where X represents chlorine, bromine or iodine, and R' and R'' can be H or an alkyl group. Preferred compounds include 3,3'-diamino-N-methyldipropylamine, 2,2'-diamino-N-methyldiethylamine, 2,3-diamino-N-methyl-ethyl-propylamine.

For producing compounds where one A is nitrogen and one A is oxygen, one can use a process such as the one described in JP 09,012,516, the disclosure of which is incorporated herein by reference.

Examples of commercially available compounds of Formula I include N-methyldiethanolamine, 3,3'-diamino-N-methyldipropylamine and N-(2-hydroxyethyl)-N-methyl-1,3-propanediamine.

The weight ratio of (b1) to (b2) will vary depending on the amount of additional catalyst one may desire to add to the reaction mix and to the reaction profile required by the specific application. Generally if a reaction mixture with a base level of catalyst having specified curing time, (b2) is added in an amount so that the curing time is equivalent where the reaction mix contains at least 10 percent by weight less catalyst. Preferably the addition of (b2) is added to give a reaction mixture containing 20 percent less catalyst than the base level. More preferably the addition of (b2) will reduce the amount of catalyst required by 30 percent over the base level. For some applications, the most preferred level of (b2) addition is where the need for a volatile tertiary or reactive amine catalysts or organometallic salt is eliminated.

Combination of two or more autocatalytic polyols of (b2) type can also be used with satisfactory results in a single polyurethane formulation when one wants for instance to adjust blowing and gelling reactions modifying the two polyol structures with different functionalities, equivalent weights, ratio EO/PO etc, and their respective amounts in the formulations.

Acid neutralization of the polyol (b2) can also be considered when for instance delayed action is required. Acids used can be carboxylic acids such as formic or acetic acids, an amino acid or a non-organic acid such as sulfuric or phosphoric acid. More preferred options are carboxylic acids having hydroxyl functionality as described in U.S. Pat. No. 5,489,618 or carboxylic acids having halofunctionality and optionally hydroxyl functionality or aryloxy substituted carboxylic acids.

Polyols pre-reacted with polyisocyanates and polyol (b2) with no free isocyanate functions can also be used in the polyurethane formulation. Isocyanate prepolymers based on polyol (b2) can be prepared with standard equipment, using conventional methods, such a heating the polyol (b2) in a reactor and adding slowly the isocyanate under stirring and then adding eventually a second polyol, or by prereacting a first polyol with a diisocyanate and then adding polyol (b2).

The isocyanates which may be used with the autocatalytic polyols of the present invention include aliphatic, cycloaliphatic, arylaliphatic and aromatic isocyanates. Aromatic isocyanates, especially aromatic polyisocyanates are preferred.

Examples of suitable aromatic isocyantes include the 4,4'-, 2,4' and 2,2'-isomers of diphenylmethane diisocyante (MDI), blends thereof and polymeric and monomeric MDI blends toluene-2,4- and 2,6-diisocyanates (TDI), m- and p-phenylenediisocyanate, chlorophenylene-2,4-diisocyanate, diphenylene-4,4'-diisocyanate, 4,4'-diisocyanate-3,3'-dimehtyldiphenyl, 3-methyldiphenyl-methane-4,4'-diisocyanate and diphenyletherdiisocyanate and 2,4,6-triisocyanatotoluene and 2,4,4'-triisocyanatodiphenylether.

Mixtures of isocyanates may be used, such as the commercially available mixtures of 2,4- and 2,6-isomers of toluene diisocyantes. A crude polyisocyanate may also be used in the practice of this invention, such as crude toluene diisocyanate obtained by the phosgenation of a mixture of toluene diamine or the crude diphenylmethane diisocyanate obtained by the phosgenation of crude methylene diphenylamine. Especially preferred are methylene-bridged polyphenyl polyisocyanates and mixtures thereof with crude diphenyl methylene diisocyanates. TDI/MDI blends may also be used. MDI or TDI based prepolymers can also be used, made either with polyol (b1), polyol (b2) or any other polyol as described heretofore. Isocyanate-terminated prepolymers are prepared by reacting an excess of polyisocyanate with polyols, including aminated polyols or imines/enamines thereof, or polyamines.

Examples of aliphatic polyisocyanates include ethylene diisocyanate, 1,6-hexamethylene diisocyanate, 1,4-tetramethylene diisocyanate, isophorone diisocyanate, cyclohexane 1,4-diisocyanate, 4,4'-dicyclohexylmethane diisocyanate, saturated analogues of the above mentioned aromatic isocyanates and mixtures thereof.

The preferred polyisocyantes for the production of rigid or semi-rigid foams are polymethylene polyphenylene isocyanates, the 2,2', 2,4' and 4,4' isomers of diphenylmethylene diisocyanate and mixtures thereof. For the production of flexible foams, the preferred polyisocyanates are the toluene-2,4- and 2,6-diisocyanates or MDI or combinations of TDI/MDI or prepolymers made therefrom.

Isocyanate tipped prepolymer based on polyol (b2) can also be used in the polyurethane formulation. It is thought that using such an autocatalytic polyol in a polyol isocyanate reaction mixture will reduce/eliminate the presence of unreacted isocyanate monomers. This is especially of interest with volatile isocyanates such as TDI and/or aliphatic isocyanates in coating and adhesive applications since it improves handling conditions and workers safety.

For rigid foam, the organic polyisocyanates and the isocyanate reactive compounds are reacted in such amounts that the isocyanate index, defined as the number or equivalents of NCO groups divided by the total number of isocyanate reactive hydrogen atom equivalents multiplied by 100, ranges from 80 to less than 500 preferably from 90 to 100 in the case of polyurethane foams, and from 100 to 300 in the case of combination polyurethane-polyisocyanurate foams. For flexible foams, this isocyanate index is generally between 50 and 120 and preferably between 75 and 110.

For elastomers, coating and adhesives the isocyanate index is generally between 80 and 125, preferably between 100 to 110.

For producing a polyurethane-based foam, a blowing agent is generally required. In the production of flexible polyurethane foams, water is preferred as a blowing agent. The amount of water is preferably in the range of from 0.5 to 10 parts by weight, more preferably from 2 to 7 parts by weight based on 100 parts by weight of the polyol. Carboxylic acids or salts as described in BE 893,705 are also used as blowing agents and polyols such as (b2) are especially effective for this application since these autocatalytic polyols are less sensitive to acidity than conventional amine catalysts which lose most of their catalytic activity when neutralized.

In the production of rigid polyurethane foams, the blowing agent includes water, and mixtures of water with a hydrocarbon, or a fully or partially halogenated aliphatic hydrocarbon. The amount of water is preferably in the range of from 2 to 15 parts by weight, more preferably from 2 to 10 parts by weight based on 100 parts of the polyol. With excessive amount of water, the curing rate becomes lower, the blowing process range becomes narrower, the foam density becomes lower, or the moldability becomes worse. The amount of hydrocarbon, the hydrochlorofluorocarbon, or the hydrofluorocarbon to be combined with the water is suitably selected depending on the desired density of the foam, and is preferably not more than 40 parts by weight, more preferably not more than 30 parts by weight based on 100 parts by weight of the polyol. When water is present as an additional blowing agent, it is generally present in an amount from 0.5 to 10, preferably from 0.8 to 6 and more preferably from 1 to 4 and most preferably from 1 to 3 parts by total weight of the total polyol composition.

Hydrocarbon blowing agents are volatile $C_1$ to $C_5$ hydrocarbons. The use of hydrocarbons is known in the art as disclosed in EP 421 269 and EP 695 322, the disclosures of which are incorporated herein by reference. Preferred hydrocarbon blowing agents are butane and isomers thereof, pentane and isomers thereof (including cyclopentane), and combinations thereof.

Examples of fluorocarbons include methyl fluoride, perfluoromethane, ethyl fluoride, 1,1-difluoroethane, 1,1,1-trifluoroethane (HFC-143a), 1,1,1,2-tetrafluoroethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane.

Partially halogenated chlorocarbons and chlorofluorocarbons for use in this invention include methyl chloride, methylene chloride, ethyl chloride, 1,1,1-trichloroethane, 1,1-dichloro-1-fluoroethane (FCFC-141b), 1-chloro-1,1-difluoroethane (HCFC-142b), 1,1-dichloro-2,2,2-trifluoroethane (HCHC-123) and 1-chloro-1,2,2,2-tetrafluoroethane (HCFC-124).

Fully halogenated chlorofluorocarbons include trichloromonofluoromethane (CFC-11) dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. The halocarbon blowing agents may be used in conjunction with low-boiling hydrocarbons such as butane, pentane (including the isomers thereof), hexane, or cyclohexane or with water.

Use of carbon dioxide, either as a gas or as a liquid, as auxiliary blowing agent is especially of interest when water is present with the present technology since polyols (b2) are less sensitive to acidity than conventional amines.

In addition to the foregoing critical components, it is often desirable to employ certain other ingredients in preparing polyurethane polymers. Among these additional ingredients are surfactants, preservatives, flame retardants, colorants, antioxidants, reinforcing agents, stabilizers and fillers.

In making polyurethane foam, it is generally preferred to employ an amount of a surfactant to stabilize the foaming reaction mixture until it cures. Such surfactants advantageously comprise a liquid or solid organosilicone surfactant. Other surfactants include polyethylene glycol ethers of long-chain alcohols, tertiary amine or alkanolamine salts of long-chain alkyl acid sulfate esters, alkyl sulfonic esters and alkyl arylsulfonic acids. Such surfactants are employed in amounts sufficient to stabilize the foaming reaction mixture against collapse and the formation of large, uneven cells. Typically, 0.2 to 3 parts of the surfactant per 100 parts by weight total polyol (b) are sufficient for this purpose.

Use of (b2) is also of interest with semi-rigid foams, shock absorbing foams, water dispersible latex, elastomers, integral skin foams, RIM materials, PUR cast systems, paints and coatings, adhesive, binders, all applications described in "Polyurethane Handbook", edited by G. Oertel, Hanser publishers, Munich. For these applications no changes of processing are required when using polyol (b2) of the present invention. Only a reduction or elimination of conventional, migratory catalysts is obtained.

One or more catalysts for the reaction of the polyol (and water, if present) with the polyisocyanate can be used. Any suitable urethane catalyst may be used, including tertiary amine compounds, amines with isocyanate reactive groups and organometallic compounds. Preferably the reaction is carried out in the absence of an amine or an organometallic catalyst or a reduced amount of catalyst as described above. Exemplary tertiary amine compounds include triethylenediamine, N-methylmorpholine, N,N-dimethylcyclohexylamine, pentamethyldiethylenetriamine, tetramethylethylenediamine, bis (dimethylaminoethyl)ether, 1-methyl-4-dimethylaminoethyl-piperazine, 3-methoxy-N-dimethylpropylamine, N-ethylmorpholine, dimethylethanolamine, N-cocomorpholine, N,N-dimethyl-N',N'-dimethyl isopropylpropylenediamine, N,N-diethyl-3-diethylamino-propylamine and dimethylbenzylamine. Exemplary organometallic catalysts include organomercury, organolead, organoferric and organotin catalysts, with organotin catalysts being preferred among these. Suitable tin catalysts include stannous chloride, tin salts of carboxylic acids such as dibutyltin di-laurate, as well as other organometallic compounds such as are disclosed in U.S. Pat. No. 2,846,408. A catalyst for the trimerization of polyisocyanates, resulting in a polyisocyanurate, such as an alkali metal alkoxide or quaternary ammonium carbonylate salts as described in U.S. Pat. No. 4,040,992 and such as Dabco TMR sold by Air Products and Chemicals Inc may also optionally be employed herein. The amount of catalyst can vary from 0.02 to 5 percent in the formulation or organometallic catalysts from 0.001 to 1 percent in the formulation can be used.

A crosslinking agent or a chain extender may be added, if necessary. The crosslinking agent or the chain extender includes low-molecular polyhydric alcohols such as ethylene glycol, diethylene glycol, 1,4-butanediol, and glycerin; low-molecular amine polyol such as diethanolamine and triethanolamine; polyamines such as ethylene diamine, xlylenediamine, and methylene-bis(o-chloroaniline). The use of such crosslinking agents or chain extenders is known in the art as disclosed in U.S. Pat. Nos. 4,863,979 and 4,963,399 and EP 549,120, the disclosure of which are incorporated herein by reference.

When preparing rigid foams for use in construction, a flame retardant is generally included as an additive. Any known liquid or solid flame retardant can be used with the autocatalytic polyols of the present invention. Generally such flame retardant agents are halogen-substituted phosphates and inorganic flame proofing agents. Common halogen-substituted phosphates are tricresyl phosphate, tris (1,3-dichloropropyl phosphate, tris(2,3-dibromopropyl) phosphate and tetrakis (2-chloroethyl)ethylene diphosphate. Inorganic flame retardants include red phosphorous, aluminum oxide hydrate, antimony trioxide, ammonium sulfate, expandable graphite, urea or melamine cyanurate or mixtures of at least two flame retardants. In general, when present, flame retardants are added at a level of from 5 to 50 parts by weight, preferable from 5 to 25 parts by weight of the flame retardant per 100 parts per weight of the total polyol present.

The applications for foams produced by the present invention are those known in the industry. For example, rigid foams are used in the construction industry and for insulation for appliances and refrigerators. Flexible foams and elastomers find use in applications such as furniture, shoe soles, automobile seats, sun visors, steering wheels, armrests, door panels, noise insulation parts and dashboards. Addition of recycled powder foam into the polyurethane products object of the invention, as disclosed for example in EP 711,221 or in GB 922,306, can also be practiced with the present invention.

Processing for producing polyurethane products are well known in the art. In general components of the polyurethane-forming reaction mixture may be mixed together in any convenient manner, for example by using any of the mixing equipment described in the prior art for the purpose such as described in Polyurethane Handbook, by G. Oertel, Hanser publisher.

The polyurethane products are either produced continuously or discontinuously, by injection, pouring, spraying, casting, calendering, etc; these are made under free rise or molded conditions, with or without release agents, in-mold coating, or any inserts or skin put in the mold. In case of flexible foams, those can be mono- or dual-hardness.

For producing rigid foams, the known one-shot prepolymer or semi-prepolymer techniques may be used together with conventional mixing methods including impingement mixing. The rigid foam may also be produced in the form of slabstock, moldings, cavity filling, sprayed foam, frothed foam or laminates with other material such as paper, metal, plastics or wood-board. Flexible foams are either free rise and molded while microcellular elastomers are usually molded.

The following examples are given to illustrate the invention and should not be interpreted as limiting in anyway. Unless stated otherwise, all parts and percentages are given by weight.

A description of the raw materials used in the examples is as follows:

| | |
|---|---|
| DEOA 100% | is pure diethanolamine. |
| Niax L3002 | is a silicon surfactant available from CK-Witco-Osi Specialties. |
| Tegostab B8715 LF | is a silicon-based surfactant available from Goldschmidt AG. |
| Tegostab B8719 LF | is a silicon-based surfactant available from Goldschmidt AG. |
| Tegostab B8427 | is a silicon-based surfactant available from Goldschmidt AG. |
| Dabco NE-1060 | is a reactive amine catalyst available from Air Products and Chemical Inc. |
| Dabco 33 LV | is a tertiary amine catalyst available from Air Products and Chemicals Inc. |
| Dabco DMEA | is a tertiary amine catalyst available from Air Products and Chemicals Inc. |
| Polycat 8 | is a tertiary amine catalyst available from Air Products and Chemicals Inc. |
| Toyocat RX-20 | is a reactive amine catalyst available from Tosoh Corporation. |
| Niax A-1 | is a tertiary amine catalyst available from CK-Witco-Osi Specialties Inc. |
| Niax A-4 | is a tertiary amine catalyst available from CK-Witco Osi Specialties Inc. |
| Niax C-182 | is a blend of tertiary amine catalysts available from CK-Witco-Osi Specialties Inc. |
| VORANOL CP 1421 | is glycerine initiated polyoxypropylene polyoxyethylene polyol having an average hydroxyl number of 32 available from The Dow Chemical Company. |
| VORANOL 9815 | is a glycerol initiated polyoxypropylene polyoxyethylene polyol having an average hydroxyl number of 28 available from The Dow Chemical Company. |
| VORANOL CP 6001 | is a glycerol initiated polyoxypropylene polyoxyethylene polyol having an average hydroxyl number of 28 available from The Dow Chemical Company. |
| VORANOL CP 4702 | is a glycerol initiated polyoxypropylene polyoxyethylene polyol having an average hydroxyl number of 32 available from The Dow Chemical Company. |
| VORANOL CP 3001 | is a glycerol initiated polyoxypropylene polyoxyethylene polyol having an average hydroxyl number of 56 available from The Dow Chemical Company. |
| VORANOL EP 2001 | is a dipropylene glycol (DPG) initiated polyoxypropylene, polyoxyethylene diol with an average hydroxyl number of 56 available from The Dow Chemical Company. |
| 1,4-BDO | is 1,4-butane diol dried with Baylith L paste, a molecular sieve. |
| SPECFLEX NC-700 | is a 40% SAN based copolymer polyol with an average hydroxyl number of 20 available from The Dow Chemical Company. |
| VORANOL RH 360 | is a high functional polyol with an average hydroxyl number of 360 available from The Dow Chemical Company. |
| ISONATE M-125 | is an MDI based isocyanate available from The Dow Chemical Company. |

-continued

| | |
|---|---|
| Isonate M-140 | is an MDI based isocyanate available from the Dow Chemical Company. |
| SPECFLEX NS 540 | is an MDI-based isocyanate available from The Dow Chemical Company. |
| VORANATE T-80 | is TDI 80/20 available from The Dow Chemical Company. |
| VORANATE M-229 | is a PMDI available from The Dow Chemical Company. |
| Polyol A | is a 1,000 equivalent weight propoxylated diol with 15% EO capping initiated with N-methyl diethanolamine. |
| Polyol B | is a 1,000 EW propoxylated tetrol with 15% EO capping initiated with 3,3'-diamino-N-methyldipropylamine. |
| Polyol C | is a prepolymer based on an equal molar reaction between polyol A, Isonate M-125 and VORANOL CP 4702. (Polyol A is reacted at 50° C. with VORANOL CP 4702 using isocyanate M-125 in a stoichiometric ratio of polyol A, VORANOL CP 4702 and Isonate M-125. The final polymerization is carried out at 75° C. for three hours. Polyol C has a viscosity of 28,000 mPa · s at 25° C.). |
| Polyol D | is a prepolymer based on one mole of polyol A reacted with 2 moles of Isonate M-125 and 2 moles of VORANOL CP 3001 (same procedure for this reaction as with polyol C). |
| Polyol E | is a 1,000 EW propoxylated tetrol with 16% EO capping initiated with Ethylenediamine. |
| Polyol F | is a 1,700 EW propoxylated tetrol With 15% EO capping, initiated with 3,3'-Diamino-N-methyl dipropylamine. |
| Polyol G | is a 200 EW propoxylated tetrol initiated with 3,3'-Diamino-N-methyl dipropylamine. |
| Isocyanate H | is a prepolymer based on one mole of polyol A reacted with 2 moles of Isonate M-125. |
| Isocyanate I | is a prepolymer based on one mole of VORANOL EP 2001 reacted with 2 moles of Isonate M-125. |

All foams were made in the laboratory by preblending polyols, surfactants, crosslinkers, catalysts and water, then by adding the isocyanates under stirring at 3,000 RPM for 5 seconds. At the end of mixing the reactants are poured either in a cardboard box or in a plastic cup for free rise foaming, or are poured in a 30×30×10 cm aluminum mold heated at 55° C. which is subsequently closed. The release agent used is Klueber 41-2013 available from Klueber Chemie. With free rise foams main reactivity parameters such as cream time, gel time and full rise time are recorded. In the case of molded parts, curing at a specific demolding times is assessed by manually demolding the part and looking at hand marking defects until the minimum demolding time is reached where there is no surface defects. With both free rise and molded foam, density in kg/m$^3$ is measured since it is a critical parameter.

Elastomers were made by mixing 200 grams of polyols (b1) and (b2) or of polyol (b1) by itself with various amounts of Dabco 33 LV to get different curing times, or of polyol (b2) by itself with a reduced amount of Dabco 33 LV, with 5 parts of 1,4-BDO. These polyols (b1) and or (b2) had been first dried under vacuum over night. Isocyanate M-340 was then added with the amounts indicated in the Examples, and the mixture was stirred carefully with a tongue depressor for 10 seconds. After this mixing, 175 grams of these reactants, when still liquid, were poured in a Teflon™ coated cylinder mold (internal diameter 50 mm; height 100 mm) and a thin thermocouple was inserted in the middle of the mold at 75 mm depth to record core temperature of these reactants. The values in the Examples for core temperatures (° C.) were measured 10 minutes after mixing in and the physical aspect of the elastomers after 40 minutes.

EXAMPLE 1

Free rise flexible foams were made according to formulation 1A and 1B based on polyols of the invention. For comparison free rise foams were made according to formulations 1C and 1D, using either a conventional amine-initiated polyol or the starter of polyol A as a catalyst at the same concentration as it is present in 100 part by weight of polyol A, both foams are not part of the invention (all formulations are in parts by weight). Data on the formulations and foam properties are given in Table I.

TABLE I

| | 1A | 1B | 1C* | 1D* |
|---|---|---|---|---|
| Polyol A | 100 | | | |
| Polyol B | | 100 | | |
| Polyol E | | | | 100 |
| VORANOL EP 2001 | | | 94.05 | |
| N-Methyl-diethanol amine | | | 5.95 | |
| Niax L-3002 | 0.5 | 0.5 | 0.5 | 0.5 |
| Water | 4.4 | 4.4 | 4.4 | 4.4 |
| Specflex NS 540 | 54.6 | 54.6 | 54.6 | 54.6 |
| Cream Time (s) | 6 | 7 | 12 | 25 |
| Gel Time (s) | 38 | 44 | Collapsed | Collapsed |
| Rise Time (s) | 62 | 72 | | |
| Density (g/lt.) | 27.5 | 31.2 | N/A | N/A |

*Not an example of the present invention

EXAMPLE 2

Two free rise and two molded flexible PU foams were made with the following formulations 2A and 2B, containing no amine catalysts and catalyzed only with polyols of the invention. As a comparison, two foams were produced with amine catalysts as reported in columns 2C (not part of the invention). For all of these foams the demolding time was 5 minutes. Data on the formulations and foam properties are given in Table II

TABLE II

| | Formulation 2A | | Formulation 2B | | Formulation 2C* | |
|---|---|---|---|---|---|---|
| Process | Free rise | Molded | Free rise | Molded | Free rise | Molded |
| VORANOL 9815 | 36 | 36 | 26 | 26 | 66 | 66 |
| Specflex NC 700 | 24 | 24 | 24 | 24 | 24 | 24 |
| VORANOL CP 1421 | 2.0 | 2.0 | 2.0 | 2.0 | 2.0 | 2.0 |
| Polyol B | 40 | 40 | 50 | 50 | 0 | 0 |
| Water | 2.5 | 2.5 | 2.5 | 2.5 | 2.5 | 2.5 |

TABLE II-continued

|  | Formulation 2A | | Formulation 2B | | Formulation 2C* | |
| --- | --- | --- | --- | --- | --- | --- |
| Process | Free rise | Molded | Free rise | Molded | Free rise | Molded |
| DEOA 100% | 0.5 | 0.5 | 0.5 | 0.5 | 0.5 | 0.5 |
| Dabco NE-1060 | 0 | 0 | 0 | 0 | 0.25 | 0.25 |
| Toyocat RX-20 | 0 | 0 | 0 | 0 | 0.25 | 0.25 |
| Tegostab B8715LF | 0.5 | 0.5 | 0.5 | 0.5 | 0.5 | 0.5 |
| Tegostab B8719LF | 0.15 | 0.15 | 0.15 | 0.15 | 0.15 | 0.15 |
| Specflex NS-540 | 38.2 | 38.2 | 38.2 | 38.2 | 38.2 | 38.2 |
| VORANATE T-80 | 4.2 | 4.2 | 4.2 | 4.2 | 4.2 | 4.2 |
| Cream time (s) | 16 | | 15 | | 18 | |
| Gel time (s) | 143 | | 110 | | 130 | |
| Rise time (s) | 210 | | 160 | | 220 | |
| Density Kg/m3 | 64 | 59.6 | 53 | 58.9 | 50.6 | 56.4 |

*Not an example of the present invention.

EXAMPLE 3

Two free rise and two molded flexible PU foams were made with either isocyanate F, a prepolymer based on polyol A or Isocyanate G (comparative) as reported under formulations 3A and 3B respectively. Data on the foam formulations and foam properties are given in Table III.

TABLE III

|  | Formulation 3A | | Formulation 3B* | |
| --- | --- | --- | --- | --- |
| Process | Free rise | Molded | Free rise | Molded |
| VORANOL 9815 | 66 | 66 | 66 | 66 |
| Specflex NC-700 | 24 | 24 | 24 | 24 |
| VORANOL CP-1421 | 2.0 | 2.0 | 2.0 | 2.0 |
| Water | 2.5 | 2.5 | 2.5 | 2.5 |
| DEOA 100% | 0.5 | 0.5 | 0.5 | 0.5 |
| Dabco NE-1060 | 0.25 | 0.25 | 0.25 | 0.25 |
| Toyocat RX-20 | 0.25 | 0.25 | 0.25 | 0.25 |
| Tegostab B 8715LF | 0.5 | 0.5 | 0.5 | 0.5 |
| Tegostab B 8719LF | 0.15 | 0.15 | 0.15 | 0.15 |
| Specflex NS-540 | 36.9 | 36.9 | 36.9 | 36.9 |
| VORANATE T-80 | 4.1 | 4.1 | 4.1 | 4.1 |
| Isocyanate H | 12.5 | 12.5 | 0 | 0 |
| Isocyanate I | 0 | 0 | 12.5 | 12.5 |
| Minimum demold time (min) |  | 4 |  | 5 |
| Cream time s | 12 | | 19 | |
| Gel time s | 111 | | 132 | |
| Rise time s | 168 | | 255 | |
| Density kg/m3 | 47.3 | 56.7 | 51.5 | 58.1 |

*Not an example of the present invention

EXAMPLE 4

Three free rise foams 4A, 4B and 4C and three identical molded foams were produced using three different combinations of polyol A and polyol B and without having any other catalyst in the formulation. These tests confirm that reactivity profiles can be adjusted just by using blends of autocatalytic polyols without the need for conventional catalysis. Data on the formulations and foam properties is given in Table IV.

TABLE IV

|  | 4A | 4B | 4C |
| --- | --- | --- | --- |
| VORANOL 9815 | 36 | 15.4 | 15.4 |
| Specflex NC 700 | 24 | 24 | 24 |
| Polyol A | 20 | 20.2 | 40.4 |
| Polyol B | 20 | 40.4 | 20.2 |
| VORANOL CP1421 | 2.0 | 2.0 | 2.0 |
| Water | 2.5 | 2.5 | 2.5 |
| DEOA 100% | 0.5 | 0.5 | 0.5 |
| Tegostab B8715LF | 0.5 | 0.5 | 0.5 |
| Tegostab B8719LF | 0.15 | 0.15 | 0.15 |
| Specflex NS 540 | 38.2 | 38.2 | 38.2 |
| VORANATE T-80 | 4.2 | 4.2 | 4.2 |
| Cream time (s) | 17 | 13 | 12 |
| Gel time (s) | 118 | 81 | 81 |
| Rise time (s) | 155 | 129 | 105 |
| Free rise density | 49.8 | 53.5 | 52.6 |
| Minimum demolding time minutes | 4 | 4 | 4 |
| Molded density | 58.9 | 58.3 | 59.2 |

EXAMPLE 5

The addition of the auto-catalytic polyol to a standard NVH (Noise Vibration and Harshness) formulation improves the adhesion of the foam to the EPDM (Ethylene Propylene Diene Monomer Rubber), PA (Polyamide), and EVA (Ethylene Vinyl Acetate) heavy layer as shown by the formulation 5A and 5B. Data on the formulations and foam properties are given in Table V.

TABLE V

|  | 5A* | 5B |
| --- | --- | --- |
| VORANOL CP 6001 | 100 | 100 |
| Polyol A |  | 10 |
| VORANOL CP 1421 | 3 | 3 |
| Niax L-3002 | 0.5 | 0.5 |
| Niax A-1 | 0.18 | 0.18 |
| Niax C-182 | 0.45 | 0.45 |
| Water | 4.65 | 4.65 |
| Specflex NS 540 | 54.6 | 54.6 |

*Not an example of the present invention.

A piece of PA backed carpet was attached at the bottom of a 3-L polyethylene bucket using double sided tape. The foaming mixture was poured in the bucket. After 3 minutes, the foam was removed from the bucket. The foam from the formulation 5A showed no adhesion to the heavy layer. The foam prepared from formulation 5B showed a cohesive failure of the foam that left a layer of polyurethane sticking onto the PA sheet.

EXAMPLE 6

Accelerated aging tests under heat were carried out in closed containers in the presence of a PVC sheet under the following conditions: a foam sample size 50×50×50 mm (about 6 grams of foam) cut from each of the pads' cores produced with the formulations reported hereafter was placed in the bottom of a one-liter glass jar, then a piece of gray PVC skin reference E6025373AO175A obtained from a Benecke-Kaliko was hung with a Chromium-Nickel alloy based string supported by the rim of the jar which was then sealed. All of the jars were then put in an oven heated at 115° C. for 72 hours (3 days). After cooling the PVC sheet was then measured for color changes using a Minolta Chroma Meter CR 210, which is a compact tristimulus color analyzer for measuring reflective colors of surfaces such as cloth or textured surfaces. The higher the reading and calculation of Delta E, the more colored is the sample after aging compared with the control sample of PVC skin which was aged by itself in a jar not containing any foam. The smaller the reading, the closer is the sample to the control PVC. This simple test measures the effect of the amine vapors coming from the foam on PVC dehydrochlorination and hence change in color and texture. For instance, foam 6A which is catalyzed with conventional tertiary amines and which is not part of the invention gives a strong blackening of the PVC skin as evidenced by the high Minolta rating of over 20. Data on the formulations and foam properties are given in Table VI.

TABLE VI

|  | 6A* | 6B | 6C | 6D | 6E | 6F |
|---|---|---|---|---|---|---|
| VORANOL 9815 | 76 | 26 | 10 | 66 | 8 | 26 |
| Specflex NC-700 | 24 | 24 | 24 | 24 | 24 | 24 |
| Polyol A |  |  | 20 |  |  |  |
| Polyol B |  | 50 |  |  |  |  |
| Polyol C |  |  |  |  | 68 |  |
| Polyol D |  |  |  |  |  | 50 |
| VORANOL Cp-4702 |  |  | 46 |  |  |  |
| VORANOL CP-1421 | 2.0 | 2.0 | 2.0 | 2.0 | 2.0 | 2.0 |
| Water | 2.5 | 2.5 | 2.5 | 2.5 | 2.5 | 2.5 |
| DEOA 100% | 0.5 | 0.5 | 0.5 | 0.5 | 0.5 | 0.5 |
| Niax A-1 | 0.05 |  |  |  |  |  |
| Niax A-4 | 1.6 |  |  |  |  |  |
| Dabco 33LV | 0.05 |  |  |  |  |  |
| Dabco NE-1060 |  |  | 0.25 | 0.25 | 0.25 | 0.25 |
| Toyocat RX-20 |  |  | 0.25 | 0.25 | 0.25 | 0.25 |
| Tegostab B8715LF | 0.5 | 0.5 | 0.5 | 0.5 | 0.5 | 0.5 |
| Tegostab B8719LF | 0.15 | 0.15 | 0.15 | 0.15 | 0.15 | 0.15 |
| Specflex NS-540 | 38.2 | 38.2 | 38.2 | 36.9 | 38.2 | 38.2 |
| VORANATE T-80 | 4.2 | 4.2 | 4.2 | 4.1 | 4.2 | 4.2 |
| Isocyanate F |  |  |  | 12.5 |  |  |
| Minolta Rating Delta E | 20.2 | 3.0 | 8.1 | 7.4 | 3.3 | 5.3 |

*Not part of the present invention

EXAMPLES 7

Elastomers based on polyols A and F and comparative examples based on conventional polyols (EP 2001 and CP 4702) and Dabco 33 LV as the catalysts and were made using the procedure described above. Results are shown in Table VII.

TABLE VII

| Example | 7A | 7B* | 7C* | 7D | 7E | 7F* | 7G* |
|---|---|---|---|---|---|---|---|
| Polyol A | 93.5 |  |  |  |  |  |  |
| Polyol F |  |  |  | 93.5 | 46.75 |  |  |
| CP4702 |  |  |  |  | 46.75 | 93.5 | 93.5 |
| EP 2001 |  | 93.5 | 93.5 |  |  |  |  |
| 1,4-BDO | 5.0 | 5.0 | 5.0 | 5.0 | 5.0 | 5.0 | 5.0 |
| Baylith L paste | 1.5 | 1.5 | 1.5 | 1.5 | 1.5 | 1.5 | 1.5 |
| Dabco 33 LV | 0 | 0 | 0.4 | 0 | 0 | 0 | 0.2 |
| Isonate M-340 | 34.7 | 34.4 | 34.4 | 28.3 | 28.1 | 28. | 28.0 |
| Core temperature 10' | 83.5 | 29.5 | 84.3 | 75.7 | 67.6 | 29.2 | 76.7 |
| Physical state at 40' | Soft Elastomer | liquid | Soft elastomer | cured elastomer | Cured elastomer | Liquid | Cured Elastomer |

*Not part of the present invention

The data confirm that a polyol the invention can replace a conventional tertiary amine catalyst in an elastomer formulation.

EXAMPLES 8

Rigid foams were made by pre-mixing all components except isocyanate according to the following formulations, at room temperature as follows:

|  | Formulation | |
|---|---|---|
|  | A | B |
| Voranol RH 360 | 94.1 | 89.1 |
| Polyol G | 0 | 5.0 |
| Water | 1.8 | 1.8 |
| Dabco DMEA | 1.8 | 1.6 |
| Polycat 8 | 0.8 | 0.6 |
| Tegostab B8427 | 1.5 | 1.5 |
| Voranate M-229 | 128 | 131 |

Then Voranate M-229 was added to the formulation and mixed at 3,000 RPM for 6 seconds and this mixture was poured in a 2 liter container and allowed to free rise while cream, gel and tack free times were recorded.

Two rigid foams were produced using the formulations A and B and the procedure described above. Reactivity times are reported in Table VIII.

TABLE VIII

| Formulation | A* | B |
|---|---|---|
| Experimental polyol | None | Polyol G |
| Cream Time (s) | 21 | 18 |
| Gel Time (s) | 72 | 55 |
| Tack Free Time (s) | 118 | 92 |
| Foam aspect | OK | OK |

*Not part of the invention

These data confirm that a substitution of 15 percent conventional amine catalysts with 5 parts by weight of polyol G gives a faster reactivity in a rigid foam system.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A process for the production of a polyurethane product by reaction of a mixture of:
   (a) at least one organic polyisocyanate with
   (b) a polyol composition comprising
      (b1) from 0 to 95 percent by weight of a polyol compound having a functionality of 2 to 8 and a hydroxyl number of from 20 to 800 and
      (b2) from 5 to 100 percent by weight of at least one polyol compound having a functionality of 1 to 8 and a hydroxyl number of from 20 to 800,
   wherein the weight percent is based on the total amount of polyol component (b), and (b2) is
   (b2a) obtained by alkoxylation of at least one initiator molecule of the formula:

 Formula (I)

where n and p are independently integers from 2 to 6,
   A at each occurrence is independently oxygen, nitrogen or hydrogen, with the proviso that only one of A can be hydrogen at one time,
   R is a $C_1$ to $C_3$ alkyl group,
   m is equal to 0 when A is hydrogen, is 1 when A is oxygen and is 2 when A is nitrogen;
   or (b2b) a compound which contains an alkyl amine within the polyol chain or a dialkylylamino group pendant to the polyol chain wherein the polyol chain is obtained by copolymerization of at least one monomer containing an alkylaziridine or N,N-dialkyl glycidylamine with at least one alkylene oxide, wherein the alkyl or di-alkyl moiety of the amine is a $C_1$ to $C_3$ alkyl;
   or (b2c) a hydroxyl-tipped prepolymer obtained from the reaction of an excess of (b2a) or (b2b) with a polyisocyanate;
   or (b2d) is a blend selected from (b2a), (b2b) or (b2c);
   (c) optionally in the presence of a blowing agent and
   (d) optionally additives or auxiliary agents known per se for the production of polyurethane foams, elastomers and/or coatings.

2. The process of claim 1 wherein A at each occurrence in Formula I is nitrogen.

3. The process of claim 2 wherein the compound represented by Formula I is 3,3'-diamino-N-methyldipropylamine, 3,3'-diamino-N-ethyldipropylamine, 2,2'-diamino-N-methyldiethylamine.

4. The process of claim 1 wherein A at each occurrence in Formula I is oxygen.

5. The process of claim 4 wherein the compound represented by Formula I is N-methyldiethanolamine or N-methyldipropanolamine.

6. The process of claim 1 wherein one A in formula I is oxygen and the other A is nitrogen.

7. The process of claim 6 wherein the compound represented by Formula I is N-(2-hydroxyethyl)-N-methyl-1,3-propanediamine, or N-(2-hydroxyethyl)-N-methyl-1,2-ethanediamine.

8. The process of claim 1 wherein (b2b) is derived from an alkylaziridine.

9. The process of claim 8 wherein the alkylaziridine is methylaziridine.

10. The process of claim 1 wherein (b2b) is derived from an N,N-dialkyl glycidylamine.

11. The process of claim 10 wherein the N,N-dialkyl glycidylamine is N,N-dimethyl glycidylamine.

12. The process of claim 1 for making a rigid polyurethane foam wherein the polyols (b1) and (b2) have an average functionality of 3 to 6 and an average hydroxyl number of 200 to 800.

13. The process of claim 12 wherein the blowing agent is a hydrocarbon, a hydrochlorofluorocarbon, a hydrofluorocarbon a hydrochlorocarbon or a mixture thereof.

14. The process of claim 13 wherein the blowing agent contains 0.5 to 10 parts by weight water per 100 parts per weight of(b).

15. The process of claim 14 where the reaction mixture contains one or more flame retardants.

16. The process of claim 13 wherein the polyisocyanate is polymethylene polyphenylene diisocyanate, or isomers of diphenylmethylene diisocyanate or mixtures thereof.

17. The process of claim 1 for making a flexible polyurethane foam wherein the polyols (b1) and (b2) have an average functionality of 2 to 4 and an average hydroxyl number of 20 to 100.

18. The process of claim 17 wherein the blowing agent is water in an amount from 0.5 to 10 parts by weight of component b.

19. The process of claim 18 wherein carbon dioxide is used either as a gas or as a liquid in the formulation to act as an auxiliary blowing agent.

20. The process of claim 17 wherein an acid is used in the polyurethane formulation to act either as a delayed action additive or as a blowing agent in case of carboxylic acids.

21. The process of claim 17 wherein the polyisocyanate is toluene diisocyanate, polymethylene polyphenylene diisocyanate, isomers of diphenylmethylene diisocyanate or mixtures thereof.

22. The process of claim 1 for producing an elastomer, a coating or an adhesive.

23. The process of claim 1 for producing a foam containing an integral skin.

24. The process of claim 1 wherein the polyisocyanate (a) contains at least one polyisocyanate that is a reaction product of a excess of polyisocyanate with a polyol which contains an alkyl amine group of (b2a) or (b2b).

25. The process of claim 1 wherein the polyol (b) contains a polyol-terminated prepolymer obtained by the reaction of an excess of polyol with a polyisocyanate wherein the polyol is a polyol as defined by (b2) or is a mixture of (b2) with another polyol.

26. A rigid polyurethane product produced by the process of claim 1.

27. A flexible polyurethane product produced by claim 1.

28. An elastomer, a coating or an adhesive product produced by the process of claim 1.

29. An integral-skin product produced by the process of claim 1.

30. The process of claim 1 where the amount of (b2) is present in an amount so that the curing time is substantially equivalent to a similar reaction mixture containing standard polyurethane catalysts, where the reaction mix with b2 contains at least 10 percent by weight less catalyst.

31. A process for the production of a polyurethane foam by reaction of a mixture of
(a) at least one organic polyisocyanate with
(b) a polyol composition comprising:
  (b1) from 0 to 95 percent by weight of a polyol compound having a functionality of 2 to 8 and a hydroxyl number of from 20 to 800 and
  (b2) from 5 to 100 percent by weight of at least one polyol compound having a functionality of 1 to 8 and a hydroxyl number of from 20 to 800, wherein the weight percent is based on the total amount of polyol component (b), and (b2) is
  (b2a) obtained by alkoxylation of at least one initiator molecule of the formula:

$$H_m A\text{-}CH_2)_n\text{-}N(R)(CH_2)_p\text{-}AH_m \quad \text{Formula (I)}$$

where n and p are independently integers from 2 to 6,

A at each occurrence is independently oxygen, nitrogen or hydrogen, with the proviso that only one of A can be hydrogen at one time, R is a $C_1$ to $C_3$ alkyl group, m is equal to 0 when A is hydrogen, is 1 when A is oxygen and is 2 when A is nitrogen;

or (b2b) a compound which contains an alkyl amine within the polyol chain or a dialkylylamino group pendant to the polyol chain wherein the polyol chain is obtained by copolymerization of at least one monomer containing an alkylaziridine or N,N-dialkyl glycidylamine with at least one alkylene oxide, wherein the alkyl or di-alkyl moiety of the amine is a $C_1$ to $C_3$ alkyl;

or (b2c) a hydroxyl-tipped prepolymer obtained from the reaction of an excess of (b2a) or (b2b) with a polyisocyanate;

or (b2d) is a blend selected from (b2a), (b2b) or (b2c);

(c) in the presence of a blowing agent and (d) optionally additives or auxiliary agents known per se for the production of polyurethane foams, wherein a portion of the polyisocyanate component is an isocyanate terminated prepolymer of a polyol (b2).

* * * * *